United States Patent [19]
Moessinger

[11] Patent Number: 5,893,937
[45] Date of Patent: Apr. 13, 1999

[54] AIR FILTER ESPECIALLY FOR CLEANING COMBUSTION AIR FOR INTERNAL COMBUSTION ENGINES

[75] Inventor: Klaus Moessinger, Obersulm, Germany

[73] Assignee: Filterwerk Mann & Hummel GmbH, Ludwigsburg, Germany

[21] Appl. No.: 08/952,784

[22] PCT Filed: Feb. 16, 1996

[86] PCT No.: PCT/EP96/00665
§ 371 Date: Nov. 26, 1997
§ 102(e) Date: Nov. 26, 1997

[87] PCT Pub. No.: WO96/37277
PCT Pub. Date: Nov. 28, 1996

[30] Foreign Application Priority Data

May 26, 1995 [DE] Germany ................. 19519438

[51] Int. Cl.$^6$ .................................................. B01D 46/02
[52] U.S. Cl. ................... 55/385.3; 55/505; 55/506; 55/514; 55/DIG. 28
[58] Field of Search ..................... 55/385.3, 505, 55/506, 514, DIG. 28

[56] References Cited

U.S. PATENT DOCUMENTS

| | | | |
|---|---|---|---|
| 3,785,129 | 1/1974 | Szmutko | 55/514 |
| 4,605,426 | 8/1986 | Thornburgh | 55/DIG. 28 |
| 4,720,292 | 1/1988 | Engel et al. | 55/514 |
| 5,484,466 | 1/1996 | Brown et al. | 55/514 |
| 5,569,311 | 10/1996 | Oda et al. | 55/DIG. 28 |
| 5,685,985 | 11/1997 | Brown et al. | 55/514 |

*Primary Examiner*—Jay H. Woo
*Assistant Examiner*—Minh-Chau T. Pham
*Attorney, Agent, or Firm*—Evenson,McKeown, Edwards & Lenahan, P.L.L.C.

[57] ABSTRACT

An air filter, especially for cleaning combustion air for internal combustion engines. The air filter includes a substantially cylindrical housing having a raw inlet and a pure air outlet. A pure air outlet is fitted substantially concentrically on the face of a cylindrical housing. The raw air inlet is fitted on the surface of the housing jacket, and an essentially menthol-free filter element is secured in the housing. The housing aperture is fitted with adaptive systems having an integrated dirt extractor.

7 Claims, 2 Drawing Sheets

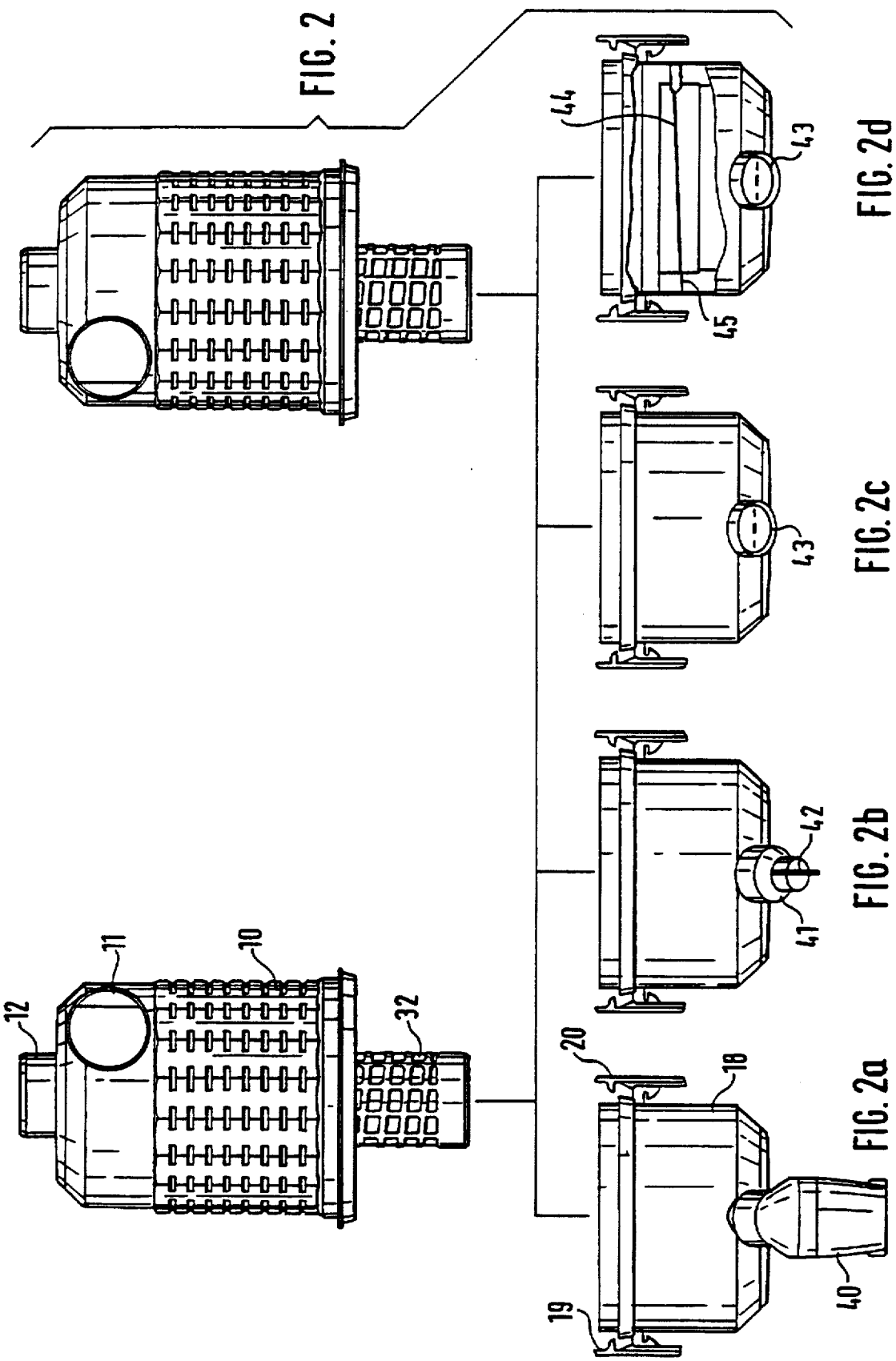

AIR FILTER ESPECIALLY FOR CLEANING COMBUSTION AIR FOR INTERNAL COMBUSTION ENGINES

BACKGROUND OF THE INVENTION

The invention relates to an air filter, especially for the air intake of internal combustion engines.

Such an air filter is disclosed in German Patent 42 41 586. This known filter can be used anywhere, i.e., it can be used both in motor vehicle manufacture and in earth-moving machines or construction machines. The filter inserts of these air filters are replaced after a certain period of time. Depending on the amount of dust involved, the useful life of an air filter can be from a few days (construction machinery) to several months.

Especially in machines or vehicles which are used in very dusty areas, it is necessary to remove the dust from the housing continuously or at intervals. In the state of the art a dust discharge opening is provided for this purpose.

It has been found in such filter systems that various applications necessitate adaptations regarding the filter insert, the pore size or the addition of safety elements or the like. Thus it is desirable to match the filter system to the particular application, and of course the adaptation is to be made reasonably economical.

SUMMARY OF THE INVENTION

The object of the present invention therefore lies in the creation of a filter which makes possible an improved adaptation of the dust discharge for various applications.

This object is achieved, setting out from the preamble of the principal claim, by its distinctive features.

The advantage of the invention is that, with a single replaceable element, a series of filter systems is created which is optimally adaptable to operating conditions. At the same time the replaceable element is essentially a part which on the one hand closes the housing of the air filter and on the other hand has an opening for discharging the dirt, which can be provided with various elements and which itself can be configured to permit an optimal separation of the dirt.

According to one advantageous embodiment of the invention, a cyclone for preliminary separation of dust is provided at the raw air intake. This cyclone consists of vanes which produce a swirling flow and thus separate a great amount of dirt from the raw air. The cyclone can be configured as a radial cyclone or also as an axial cyclone. The dirt separated passes into the system adapted to the housing opening and is discharged cyclically or continuously.

According to an advantageous embodiment, a dust dumping valve is provided for discharging dirt. A dirt collecting chamber is placed in the housing cover ahead of the dust dumping valve. On account of the pulsation of the aspirated air, which develops in internal combustion engines due to the reactive effect of the engine's valve movements, the dust dumping valve opens and closes, so that a nearly continuous dust removal takes place.

In another embodiment the dirt collecting chamber is integrated with the dust dumping valve. The latter supplements or replaces the dirt collecting chamber disposed in the housing lid.

An alternative embodiment of the invention consists in the arrangement of a valve with deflector at the dirt dumping opening. Such a valve has a very low resistance to flow, so that dust removal is performed even by very weak pulsations.

Another embodiment of the invention, which is advantageous especially where no pulsation is present, consists in providing a partition in the housing lid, which has an opening. Under this partition the dirt collects for removal. Due to the cyclone effect a certain overpressure occurs in the chamber under the partition, which suffices to open the valve cyclically to discharge the dust.

According to a further embodiment, the integrated dirt dumping can be connected to a system for aspirating the dust—for example an ejector system by which the dirt is then carried through the exhaust line to the open air.

These and additional features of preferred embodiments of the invention will be found not only in the claims but also in the description and the drawings, and the individual features can be realized each singly or plurally in the form of subcombinations in the embodiment of the invention and in other fields of endeavor, and may constitute advantageous and individually patentable embodiments for which protection is hereby claimed.

The invention is set forth below in connection with embodiments.

BRIEF DESCRIPTION OF THE DRAWINGS

FIG. 2 a–d, shows variants of the adaptive system.

DESCRIPTION OF PREFERRED EMBODIMENTS

Figure 1:
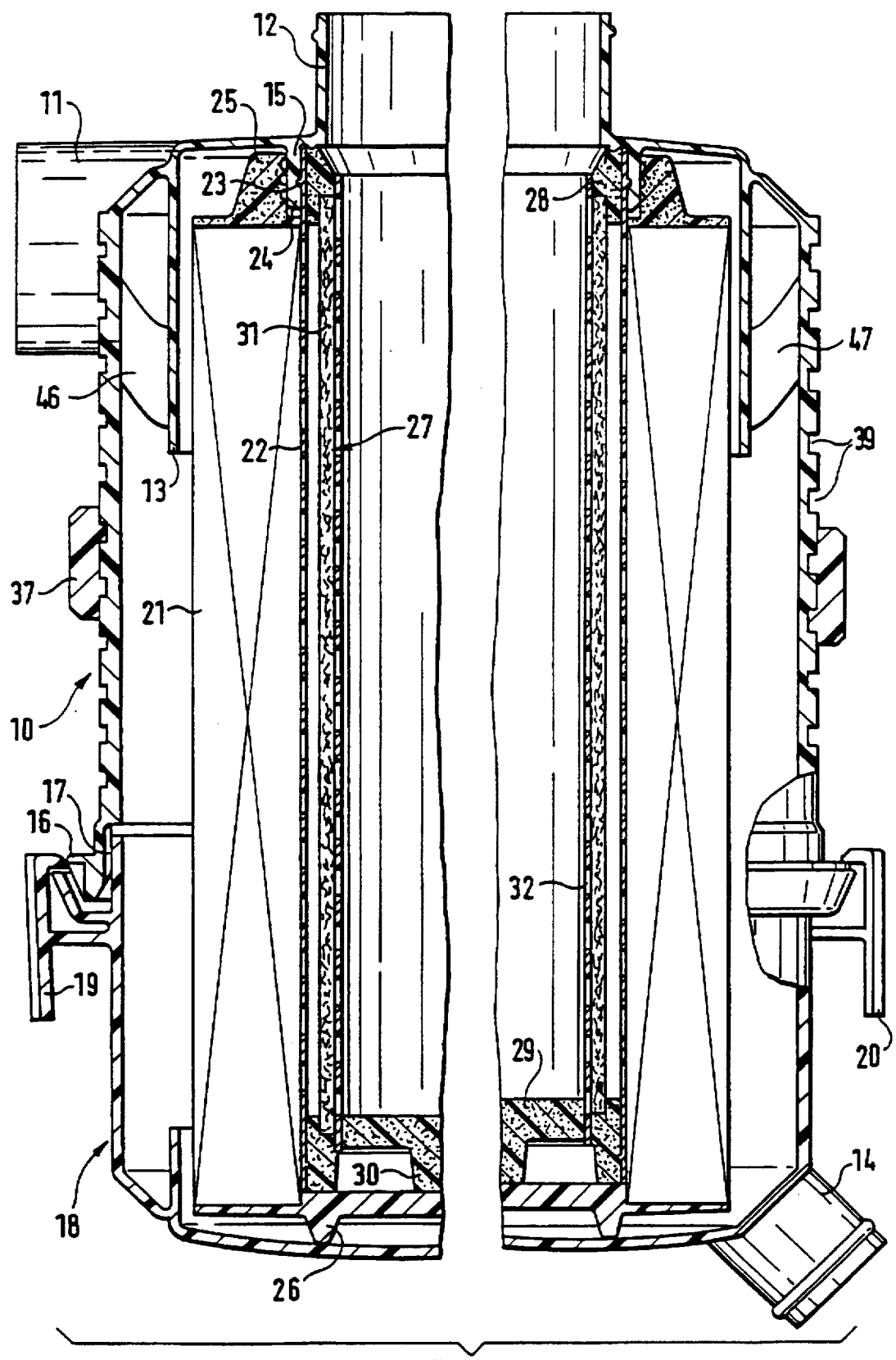
FIG. 1 shows a filter in a sectional view.

The filter shown in FIG. 1 is represented in two half sectional views. The left half section shows the filter with the cover slightly open, while the right half section shows the filter with the cover closed. The filter comprises a cylindrical housing 10 with a raw air inlet 11 and a clean air outlet 12. Near the raw air inlet a baffle 13 (dip tube) is provided. The raw air inlet entering tangentially into the housing causes a swirling flow of the raw air to be formed. This results in a separation of coarse dust particles; these coarse dust particles pass downwardly on the inner wall of the filter and are carried into the open through a dust discharge opening 14 which is closed by a known dust dumping valve.

A practical configuration of a filter is to be seen in the fact that a central tube is affixed to the housing. Since this central tube is not subject to wear or consumption, replacement is unnecessary. The central tube, which consists especially of plastic, is frictionally attached to the connecting tube of the housing. According to one embodiment of the connection of the central tube to the connecting tube, the central tube has sealing lips which are in the connection area and assure a reliable seal. A secondary element, which is arranged inside a filter insert 21, is, in contrast to the filter insert, not cleaned but is replaced if necessary. Cleaning, e.g., by knocking or washing out, is not desirable, since the secondary element can be damaged by this method of cleaning and would thus lose its effect. It is therefore equipped with a release handle which indicates whether the secondary element has been removed. This release handle has a tab which consists of plastic and is connected by a thin membrane to this end disk. If the secondary element is to be removed, this membrane is to be torn and the tab pulled upward. With this tab the secondary element can be removed. Since the tab is now in the open state, it can immediately be seen that the secondary element has been removed. According to another embodiment, the secondary element is provided with a radial and/or axial seal. In particular, the axial sealing action is reinforced by a bead on the attaching tube.

The housing 10 is furthermore provided with an attaching tube 15 and with a circumferential projection 16 and a cylindrical seat 17 for a cover 18. The cover 18 is pot-like and has at least two detent elements 19, 20. These detent elements are pivotable with respect to the cover by means of so-called flexural hinges and are made of plastic in one piece with the cover. They snap over the projection 16 of the housing 10. In the left section of FIG. 1 the detent element 19 is shown in the open position. In the cut out view of the right section the detent element 20 is shown closed.

A metal or plastic central tube 22 is fastened to the attaching tube 15 of the housing 10. To do this, the tube is provided with a bead 23 which snaps into a groove 24 in the attaching tube 15. Accidental removal of the central tube is thus no longer possible.

A filter insert 21 is slipped over the central tube 22. This filter insert bears at its upper end a radial gasket which forms one unit with the end disk of the filter insert. This radial gasket consists of a circumferential collar 25 situated outside of the plane of the filter. The collar 25 sealingly surrounds the attaching tube 15. With this kind of seal any axial change in the position of the filter insert is unimportant. Furthermore, this kind of seal is extremely reliable even in the case of vibration and shaking.

The filter insert 21 rests with its bosses 26 on the cover 18 at its bottom end. These bosses, which can also be configured as deformable ribs, serve for the axial fixation of the filter insert and for damping vibrations of the cartridge which is held loosely on the central tube 22. A secondary element 27 is disposed inside of the central tube 22; it is provided at its upper end with a polyurethane resin foam end seal 28. This end seal is tensionally fitted to the attaching tube 15. The bottom end of the secondary element 27 is provided with a polyurethane resin foam end seal 29. A plastic finger grip is integrated into this end plate 29 and serves for removing the secondary element manually if necessary. The secondary element can best consist of a nonwoven 31 which is slipped onto a tube 32. The axial force for sealing the secondary element at the clean air outlet is applied through the cover 18 and the bosses 26 of the filter insert 21 to the end seal 29.

Since the secondary element 27 is completely surrounded by the central tube 22 there is no danger that, when the filter insert is changed, the secondary element might be accidentally removed or fall out.

To assemble the entire filter, first the secondary element is inserted, then the filter insert 21 is slipped over it, and the cover 18 set in place. Due to the thrust of the secondary element against the back end of the filter insert 21 and due simultaneously to the thrust of the filter insert 21 against the cover 18, both elements are brought to their correct position by the installation of the cover. This signifies that mistaken assembly of the two elements is not possible. The end position of these elements is reached by closing the cover 18 against the seat 17.

The metal-free secondary element can be disposed of easily. The nonwoven, the polyurethane resin foam end disks, and the plastic central tube and handle, can be disposed of by burning, for example.

Since the filter insert 21 has an end seal of polyurethane resin foam at both ends, it is easily possible to knock out this filter insert and remove the dirt layer. The elastic end disks are not damaged by this, as would be the case, for example, with metal end disks.

FIG. 2 shows the filter housing 10 with the raw air inlet 11, the clean air outlet 12 and the supporting tube 32. Underneath this filter housing the different housing covers 18 are shown with the catches 19 and 20.

In FIG. 2a, a dust dumping valve is fastened to the dust discharge opening shown in FIG. 1. This dust dumping valve has a lipped opening at the bottom. In the case of pressure pulsations fed back into the filter housing through the clean air outlet 12 from an internal combustion engine, this lipped opening briefly opens, so that the dirt collecting in the dust dumping valve 40 and in the lower part of the cover 18 can escape.

FIG. 2b shows a variant of a dust dumping valve 41. This one has a compact form and is provided with a lipped opening 42 which is used especially where greater reverse pulsations occur.

In FIG. 2c there is represented a housing cover which is provided with a valve 43 with a deflector. This valve opens even upon very slight pressure differences and thus makes use of slight pressure fluctuations to dump the dust from the cover.

A deflector valve 43 is also provided in FIG. 2d. Here a partition 44 is additionally integrated in the cover. It has an opening in the area 45. The dust from the raw air area of the filter passes through this opening into the space beneath the partition.

On account of the cyclonic action of the preliminary cyclone separator disposed in the raw air area, which is represented in FIG. 1 by the vanes 46 and 47, an air stream forms which results in dynamic pressure below the partition. This dynamic pressure operates the deflector valve 43, so that here, again, the dust or dirt is discharged. The opening of the deflector valve 43 causes the dynamic pressure to decrease, so that then this valve recloses and remains closed until the back pressure increases. In this manner a cyclic dust discharge is assured.

What is claimed is:

1. An air filter, especially for cleaning combustion air for internal combustion engines, comprising:
    a substantially cylindrical housing;
    a raw air inlet disposed on a circumferential surface of the cylindrical housing;
    a cyclone provided in said housing adjacent the raw air inlet for separating dust from air passed through said filter;
    a clean air outlet disposed substantially concentrically in the cylindrical housing;
    a substantially metal-free filter insert fastened in the cylindrical housing;
    an adaptive cover removably attached to the cylindrical housing;
    a partition disposed in the adaptive cover and forming a dirt collecting chamber in said cover for receiving dust, said partition having an opening communicating between said cyclone and the dirt collecting chamber for passing dust from the cyclone to the dirt collecting chamber; and
    an integrated dirt dumping device in said cover, said integrated dirt dumping device comprising a deflector valve disposed in the integrated dirt dumping device for discharging dirt from the filter.

2. The air filter according to claim 1, wherein the adaptive cover is an adaptive system.

3. The air filter according to claim 2, wherein the integrated dirt dumping device is a dirt dumping valve and a dirt collecting chamber is disposed in the adaptive cover.

4. The air filter according to claim 2, wherein the integrated dirt dumping device is a dust dumping valve having a dirt collecting chamber disposed therein.

5. The air filter according to claim 1, wherein the integrated dirt dumping device is fixedly connected to an aspirating apparatus for removing dust.

6. The air filter according to claim 1, wherein the cyclone is one of a radial and axial cyclone.

7. The air filter according to claim 1, wherein vanes are disposed in the cyclone for generating a swirling air flow.

* * * * *